(12) United States Patent
Clarke

(10) Patent No.: US 6,719,210 B2
(45) Date of Patent: Apr. 13, 2004

(54) COLOR CHANGING SPRAYER CONTAINER

(75) Inventor: Michael T. Clarke, Alto, MI (US)

(73) Assignee: Root-Lowell Manufacturing Co., Lowell, MI (US)

( * ) Notice: Subject to any disclaimer, the term of this patent is extended or adjusted under 35 U.S.C. 154(b) by 334 days.

(21) Appl. No.: 09/915,722

(22) Filed: Jul. 26, 2001

(65) Prior Publication Data

US 2003/0019954 A1 Jan. 30, 2003

(51) Int. Cl.⁷ .................................................. B67D 5/38
(52) U.S. Cl. ........................ 239/74; 239/71; 239/333; 239/373; 239/530; 239/532; 73/295; 116/207
(58) Field of Search ......................... 239/71, 74, 333, 239/373, 525, 530, 532, 588; 73/295; 116/206, 207, 227; 374/54, 162; 222/23, 54

(56) References Cited

U.S. PATENT DOCUMENTS

| | | | |
|---|---|---|---|
| 3,561,269 A | | 2/1971 | Seitz |
| 3,696,675 A | * | 10/1972 | Gilmour ....................... 73/295 |
| 4,156,365 A | | 5/1979 | Heinmets et al. |
| 4,228,761 A | * | 10/1980 | Glover et al. ................ 116/207 |
| 4,358,955 A | * | 11/1982 | Rait ............................. 73/295 |
| 4,917,643 A | | 4/1990 | Hippely et al. |
| 4,919,983 A | | 4/1990 | Fremin |
| 4,933,525 A | | 6/1990 | St. Phillips |
| 5,072,884 A | * | 12/1991 | Ellison et al. ............... 239/373 |
| 5,099,688 A | | 3/1992 | de Mars |
| 327,528 A | | 6/1992 | Sears et al. |
| 5,323,652 A | * | 6/1994 | Parker ......................... 73/295 |
| 5,352,649 A | | 10/1994 | Shibahashi et al. |
| 5,385,044 A | | 1/1995 | Thomas et al. |
| 5,480,482 A | | 1/1996 | Novinson |
| 5,503,583 A | | 4/1996 | Hippely et al. |
| 5,588,747 A | | 12/1996 | Blevins |
| 5,591,255 A | | 1/1997 | Small et al. |
| 5,707,590 A | | 1/1998 | Thomas et al. |
| 5,720,555 A | | 2/1998 | Elele |
| 5,738,442 A | | 4/1998 | Paron et al. |
| 5,820,951 A | | 10/1998 | Osborne |
| 404,491 A | | 1/1999 | Scott |
| 5,879,443 A | | 3/1999 | Senga et al. |
| 5,894,089 A | | 4/1999 | Ogawa |
| 5,997,849 A | | 12/1999 | Small et al. |
| 6,012,411 A | | 1/2000 | Hochbrueckner |
| 6,139,779 A | | 10/2000 | Small et al. |
| 6,161,725 A | | 12/2000 | Dean |
| 6,189,805 B1 | * | 2/2001 | West et al. ................... 239/74 |
| 6,222,168 B1 | | 4/2001 | Witonsky et al. |
| 6,260,414 B1 | * | 7/2001 | Brown et al. ................. 73/295 |
| 2001/0002027 A1 | | 5/2001 | Dean |

OTHER PUBLICATIONS

RL Flo–Master WPX9001 Wallpaper Sprayer information sheet, 1994, 1 page.
RL Flo–Master Back Pack Sprayer information sheet, 1998, 1 page.

(List continued on next page.)

*Primary Examiner*—Steven J. Ganey
(74) *Attorney, Agent, or Firm*—Price, Heneveld, Cooper, DeWitt & Litton

(57) ABSTRACT

A sprayer including a sprayer container adapted to be filled with a fluid. The sprayer container has at least a portion thereof including thermochromic color-changing properties. The sprayer container includes an interior surface and an exterior surface. A spraying gun is connected to the sprayer container, with the spraying gun including a trigger for selectively spraying pressurized fluid in the sprayer container onto a predetermined object. The sprayer container indicates the amount of fluid in the sprayer container by a color change line located at a transition line between the fluid and gas within the sprayer container when fluid is located within the sprayer container, thereby causing a top area of the sprayer container having the interior surface adjacent the gas to be a first color and a bottom area of the sprayer container having the interior surface adjacent the fluid to be a second color.

19 Claims, 1 Drawing Sheet

OTHER PUBLICATIONS

RL Flo–Master Accessories information sheet, 1995, 1 page.

RL Flo–Master Pro No Pumping Sprayer information sheet, 1995, 1 page.

RL Flo–Master Pro Plus No Pumping Sprayer information sheet, 1995, 1 page.

RL Flo–Master PGX Funnel Top Sprayer information sheet, 1995, 1 page.

RL Flo–Master LGX Funnel Top Sprayer information sheet, 1995, 1 page.

RL Flo–Master Optimum Plus Funnel Top Sprayer information sheet, 1995, 1 page.

RL Flo–Master Optimum Funnel Top Sprayer information sheet, 1995, 1 page.

RL Flo–Master Wood & Masonry Sprayers information sheet, 1995, 1 page.

RL Flo–Master Commercial Sprayer Catalog including sprayers, sevice parts and accessories, flow controls and nozzles all sold more than one year prior to Feb. 26, 2001, 6 pages.

Home Depot Professional Sprayers information sheet including sprayers all sold more than one year prior to Feb. 26, 2001, 1 page.

Triple S Commercial Pressurized Sprayers information sheet, May 1998, 1 page.

RL Flo–Master Lawn & Garden Product Line Summary including sprayers, spare parts kits and accessories all sold more than one year prior to Feb. 26, 2001, 4 pages.

* cited by examiner

COLOR CHANGING SPRAYER CONTAINER

BACKGROUND OF THE INVENTION

The present invention relates to sprayers, and in particular to portable sprayers for spraying fluids.

Portable sprayers have been used to spray stains, sealants or protective coatings on decks, fences, brick walls, concrete walks, or other wood and masonry objects. Portable sprayers have also been used to spray acids, chemicals, pesticides, herbicides, degreasers, disinfectants, water proofing, carpet treatments, cleaners, sealers, curing compounds, form release agents, germicides, herbicides, insect control fluids, or any other fluid one would desire to spray onto an object.

Heretofore, portable sprayers have typically included a tank or container for holding the fluids, a pump in the container for pressurizing the fluids in the container and a spraying gun for spraying the fluids onto a predetermined object. The containers of the portable sprayers usually included a top opening wherein the fluids are added to the containers by pouring fluids from commercial containers into the containers. Water is thereafter usually mixed with the fluids from the commercial containers to dilute the fluids according to the chemical manufacturer's instructions. The containers have typically been translucent and included graduations marked on an exterior surface of the containers for properly measuring the fluids from the commercial containers as they were poured into the container of the sprayer. However, determining the level of fluid within the sprayers by looking at the level of fluid in the translucent containers can be difficult, especially if the containers are darkly colored. Additionally, knowing the level of fluid within the sprayers can allow users of the sprayers to determine if they have enough fluid within the sprayers to complete their present spraying task or whether more fluid needs to be added to the sprayers, thereby saving time for the user if no more fluid is need. Furthermore, less fluid will be wasted if the user of the sprayer can determine that enough fluid is already in the sprayer.

Accordingly, a practical, inexpensive level indication system solving the aforementioned disadvantages and having the aforementioned advantages is desired.

SUMMARY OF THE INVENTION

The sprayer of the present invention includes sprayer container, the sprayer container having at least a portion thereof including thermochromic color-changing properties for indicating and determining the amount of fluid in the sprayer container by a color change line located at a transition line between the fluid and gas within the sprayer container. Therefore, a top area of the sprayer container having an interior surface adjacent the gas is of a first color and a bottom area of the sprayer container having an interior surface adjacent the fluid is of a second color.

These and other features, advantages, and objects of the present invention will be further understood and appreciated by those skilled in the art by reference to the following specification, claims and appended drawings.

DETAILED DESCRIPTION OF THE PREFERRED EMBODIMENTS

Figure 1:
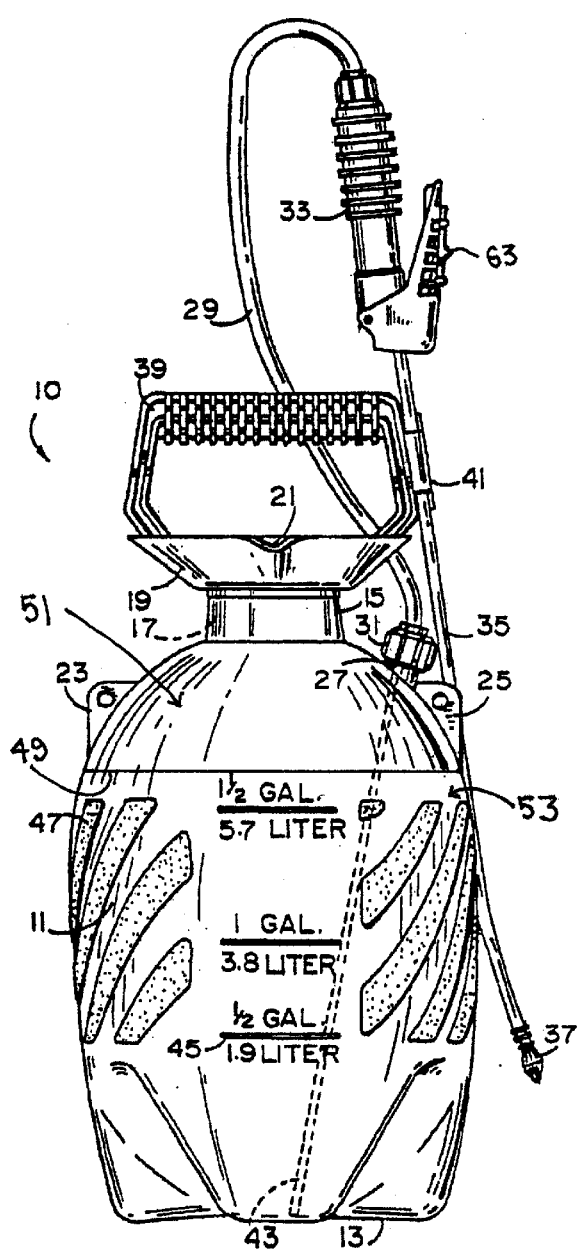
FIG. 1 is a perspective view of a sprayer kit embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a sprayer embodying the present invention. In the illustrated example, the sprayer 10 includes a sprayer container 11 having an interior surface and being adapted to be filled with a fluid. The sprayer 10 also includes a hand pump 17 for pressurizing fluid in the sprayer container 11 and a spraying gun or wand 35 for spraying the pressurized fluid within the container 11. The sprayer container 11 has at least a portion thereof including thermochromic color-changing properties for determining the amount of fluid in the sprayer container 11 by a color change line 49 located at a transition line between the fluid and gas within the sprayer container 11. Therefore, a top area 51 of the sprayer container 11 having the interior surface adjacent the gas is of a first color and a bottom area 53 of the sprayer container 11 having the interior surface adjacent the fluid is of a second color.

The illustrated sprayer container 11 is preferably used to spray a fluid located within the sprayer container 11 onto a predetermined object for covering the object with the fluid. The hand pump 17 connects to the sprayer container 11 and is actuated to pressurize the fluid in the sprayer container 11. Alternatively, the sprayer 10 could be a sprayer that is pressurized by a garden hose and does not require a hand pump. The spraying gun 35 also connects to the sprayer container 11 for spraying the pressurized fluid. In use, the fluid in the spraying container 11 is pressurized with the hand pump 17 and a handle or trigger 63 on the spraying gun 35 is depressed to eject the fluid out of a nozzle 37 of the spraying gun 35. Preferably, the sprayer container 11 holds a stain, a sealant or a protective coating for application to a deck, fences, brick walls, concrete walks, or other wood and masonry objects. The sprayer container 11 could also hold acids, chemicals, pesticides or herbicides for spraying chemicals, degreasers, disinfectants, water proofing, carpet treatments or cleaners for janitorial use, sealers, curing compounds or form release agents for concrete, germicides, herbicides or insect control fluids for agricultural use, or any other fluid to be sprayed.

In the illustrated example, the sprayer container 11 can be made from many different types of polymeric materials such as polyethylene and polypropylene, or from metal, such as stainless steel. In the preferred embodiment, the sprayer container is made from high density polyethylene. It is recommended that one tenth percent (0.1%) by weight of an ultraviolet inhibitor be incorporated in the plastic composition used to manufacture the sprayer container. The sprayer container 11 is of an elliptical configuration and is preferably made by the conventional blow molding technique. The sprayer container 11 has a rounded upper portion instead of the conventional flat portion found on cylindrical sprayer containers. The only portion of the sprayer container which is flat is the bottom of feet 13 upon which the sprayer container rests. Centrally located in the top portion of the sprayer container 11 is an internally threaded inlet 15 into which the hand pump 17 is threadedly positioned. A funnel 19, also made of high density polyethylene, having a spout 21 surrounds the top of the inlet 15. Approximately equally spaced on either side of the inlet 15 are mounted a pair of eyelets 23 and 25 to which a suitable shoulder strap (not shown) can be attached to facilitate carrying the sprayer 10. The sprayer container 11 can be made in many different sizes to fit different applications. Since it is intended to be a portable sprayer 10, the upper capacity limit would appear to be determined by the overall weight of sprayer container 11 and liquid. For most applications, a smaller sprayer container 11 would be suitable; and the one gallon and one and one-half gallon sizes are preferred. The one and one-half gallon sprayer container is approximately 14½ inches high to the top of the funnel and approximately 7½ inches at its maximum diameter. The wall thickness of the sprayer container 11 can also be varied. The sprayer container 11 should be designed to safely contain sufficient pressure for the liquid to be properly dispensed from the spray nozzle 37 on the gun 35. If the walls are too thick, the additional material merely adds to the weight of the sprayer container 11 while serving no other useful purpose. A sprayer container 11 with a wall thickness of approximately 0.125 inches is preferred for most applications. The sprayer container 11 could also include a pressure relief valve (not shown).

Figure 2:
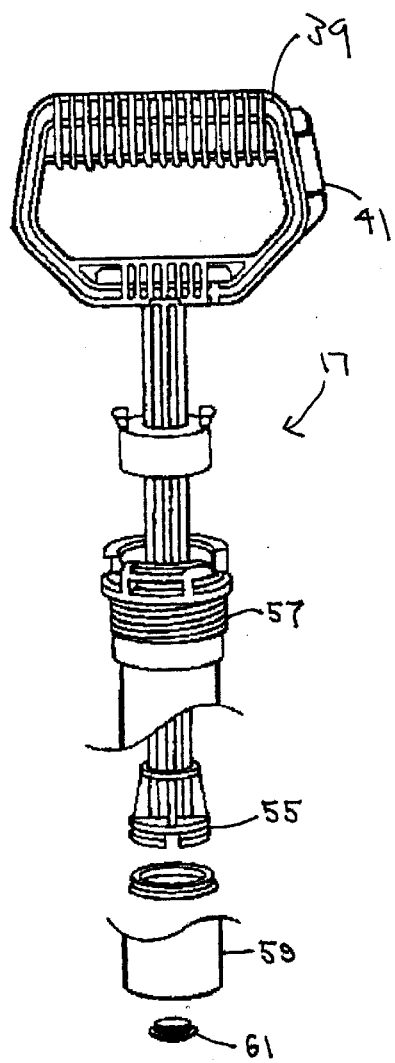
FIG. 2 is an exploded view of a hand pump of the preferred embodiment.

The illustrated hand pump 17 (FIG. 2) includes the handle 39, a plunger 55, a sleeve 57 and a cylinder 59. The plunger 55 extends into the cylinder 59 from the handle 39, and the handle 39 is actuated up and down to force air towards the bottom of the cylinder 59 with the plunger 55. A check valve 61 is located in the bottom of the cylinder 59 so that the air forced towards the bottom of the cylinder 59 can escape through the check valve 61, but air cannot enter the cylinder 59 through the check valve 61. The sleeve 57 includes an outside threaded surface 63 for engaging with the internally threaded inlet 15 of the container 11. The hand pump 17 is connected to the spraying container 11 by inserting the cylinder 59 into the funnel 19 of the spraying container 11 and screwing the outside threaded surface 63 into the internally threaded inlet 15. Once the sleeve 57 is screwed fully into the inlet 15, an air tight seal is created in the inlet 15 of the spraying container 11. The fluid in the spraying container 11 is pressurized by repetitively pressing down on the handle 39 of the hand pump 17 and forcing air into the spraying container 11. The spraying container 11, the hand pump 17 and the spraying gun 35 described above are currently sold as Model 1001PGX Sprayer by RL Flo-Master of Lowell, Mich. A sprayer 10 having the spraying container 11 and the spraying gun 35 that is pressurized by a garden hose as described above are currently sold as Model 2502TE Pro® NoPump® Sprayers by RL Flo-Master of Lowell, Mich.

The illustrated spraying container 11 includes an externally threaded outlet 27 on the top of the sprayer container to which is attached a flexible hose 29 by means of a threaded collar 31. The flexible hose 29 is attached to a hand grip and valve assembly 33 which controls the flow of material from the sprayer container 11 through the gun 35 and the nozzle 37. The gun 35 is attached to the handle 39 of the pump 17 by a pair of pressure deformable jaws 41 molded on the side of the handle 39. A siphon 43 extends from the outlet 27 to the bottom portion of the sprayer container 11 and is used to carry the pressurized material up from the bottom of the sprayer container into the hose 29.

In the illustrated example, the spraying container 11 is covered with a thermochromic ink for determining the level of liquid within the spraying container 11. A thermochromic ink is an ink that will go through a color change (or lose color) over a specific temperature range. The thermochromic ink is preferably a thermochromic epoxy screen ink sold under the trade name DYNACOLOR™ by Chromatic Technologies, Inc. of Colo. Springs, Colo. and disclosed in U.S. Pat. No. 5,591,255, the entire contents of which are hereby incorporated by reference. The ink is preferably silk screened onto the outside or external surface of the sprayer container 11 with a film thickness of preferably between 50 and 70 microns, although it is contemplated that the thermochromic ink could be placed onto the sprayer container 11 using other methods and/or with various thicknesses. Additionally, the thermochromic ink on the spraying container 11 preferably changes color at 15° C., although other temperature ranges or transition temperature could be used. Finally, the entire exterior surface of the spraying container 11 may be covered with the thermochromic ink, although it is contemplated that only the side surfaces of the spraying container 11 or a vertical strip of the side surface of the spraying container 11 may be covered with the thermochromic ink.

As an alternative to using a thermochromic ink on the exterior surface of the sprayer container 11, the sprayer container 11 can be made from a combination of plastic and a thermochromic composition that will change the color of the sprayer container 11 in the same manner as the sprayer container 11 having the thermochromic ink on the exterior surface thereof as discussed above. The sprayer container 11 comprised of plastic and a thermochromic composition can be comprised of polymeric plastic as described above and a red-to-yellow thermochromic composition sold under the part name Chromocolor #S33715 (color number) by Colors for Plastics, Inc. of Elk Grove Village, Ill. in a 25 to 1 by weight mixing ratio of plastic to thermochromic composition. However, other mixing thermochromic compositions can be mixed with the polymeric plastic or other plastic. Additionally, the mixing ratio will vary depending on the plastic used and the color of the thermochromic composition. Typically, the mixing ratio is between 100-1 to 20-1 by weight of plastic to thermochromic composition. Once the plastic and thermochromic composition is mixed, the combination is preferably blow molded to form the final configuration of the sprayer container 11.

The illustrated sprayer 10 is preferably used by first unscrewing the hand pump 17 from the top of the sprayer container 11. A measured amount of the chemical used for spraying is then poured into the spraying container 11. Thereafter, the appropriate amount of water to dilute the mixture according to the chemical manufacturer's instructions is added to the sprayer container 11. The sprayer container 11 is provided with graduations 45 marked in both English and metric units to facilitate the mixing and measuring of solutions within the sprayer container. The exterior surface of the sprayer container 11 has a texturized pattern 47 raised on the surface to assist the gripping of the sprayer container in mixing of chemicals or in pouring the contents of the sprayer container 11 out through a spout 21. Since water added to the sprayer container 11 is usually from a garden hose, the water is usually below 15° C. Consequently, when the water is added to the sprayer container 11 from the garden hose, the interior surface of the spraying container 11 begins to cool. When the interior surface of the spraying container 11 reaches 15° C., the exterior surface of the sprayer container 11 having the interior surface adjacent the fluid will change color. Therefore, the top area 51 of the exterior surface of the sprayer container 11 having the interior surface adjacent the gas (i.e., above the fluid level or color change line 49 of the sprayer container 11) is of a first color and a bottom area 53 of the exterior surface of the sprayer container 11 having the interior surface adjacent the fluid is of a second color. For example, the top area of the sprayer container 11 can have a red color and the bottom area of the sprayer container 11 will have a yellow color. However, it is contemplated that any color combination can be used. Accordingly, in order to be able to measure any level of fluid within the sprayer container 11, the spraying container 11 is preferably covered from a location adjacent the top of the spraying container 11 to a location adjacent the bottom of the spraying container 11. The hand pump 17 is then screwed back into the top of the sprayer container 11. The handle 39 is then pumped up and down to pressurize the sprayer container 11. To spray the fluid in the sprayer container, the handle or trigger 37 on the spraying gun 35 is depressed and pressure in the sprayer container 11 will force the diluted mixture up the siphon tube, through the hose and gun, and out of the adjustable nozzle. As the fluid leaves the sprayer container 11, the fluid level within the sprayer container 11 will decrease. Therefore, color change line 49 between the top area 51 of the sprayer container 11 and the bottom area 53 of the sprayer container 11 will move downward, thereby allowing a user of the sprayer 10 to easily determine the level of fluid in the sprayer container 11.

In the forgoing description, it will be readily appreciated by those skilled in the art that modifications may be made to the invention without departing from the concepts disclosed herein. For example, although a specific sprayer container 11, pump 17 and gun 35 are disclosed herein, any configuration can be used for the container 11, pump 17 and/or gun 35. Such modifications are to be considered as included in the following claims, unless these claims by their language expressly state otherwise.

I claim:

1. A sprayer comprising:
   a sprayer container adapted to be filled with a fluid, the sprayer container having at least a portion thereof including thermochromic color-changing properties, the sprayer container including an interior surface and an exterior surface; and
   a spraying gun connected to the sprayer container, the spraying gun includes a trigger for selectively spraying pressurized fluid in the sprayer container onto a predetermined object;
   wherein the sprayer container indicates the amount of fluid in the sprayer container by a color change line at the at least a portion of the sprayer container including thermochromic color-changing properties located at a transition line between the fluid and gas within the sprayer container when fluid is located within the sprayer container, thereby causing a top area of the sprayer container having the interior surface adjacent the gas to be a first color and a bottom area of the sprayer container having the interior surface adjacent the fluid to be a second color.

2. The sprayer of claim 1, wherein:
   the thermochromic color-changing properties comprise a thermochromic coating on the exterior surface of the sprayer container.

3. The sprayer of claim 2, wherein:
   the thermochromic coating is a thermochromic ink.

4. The sprayer of claim 3, wherein:
   the sprayer container is made of plastic.

5. The sprayer of claim 4, wherein:
   the sprayer container is made from blow-molded plastic.

6. The sprayer of claim 5, further including:
   a hand pump for pressurizing fluid in the sprayer container.

7. The sprayer of claim 3, wherein:
   the thermochromic ink changes from the first color to the second color at about 15° C.

8. The sprayer of claim 3, wherein:
   the sprayer container includes an annular cross section cross section located between a top of the sprayer container and a bottom of the sprayer container, the annular cross section including the top area and the bottom area.

9. The sprayer of claim 8, wherein:
   a section of the sprayer container includes an annular cross section; and
   the thermochromic ink on the exterior surface of the section of the sprayer container that has the annular cross section of the sprayer container.

10. The sprayer of claim 3, wherein:
    the sprayer container includes thermochromic ink in a vertical strip along the exterior surface of the sprayer container.

11. The sprayer of claim 1, wherein:
    the sprayer container is made of plastic.

12. The sprayer of claim 11, wherein:
    the sprayer container is made from blow-molded plastic.

13. The sprayer of claim 1, further including:
    a hand pump for pressurizing fluid in the sprayer container.

14. The sprayer of claim 1, wherein:
    the sprayer container changes from the first color to the second color at about 15° C.

15. The sprayer of claim 1, wherein:
    the sprayer container comprises plastic and a thermochromic composition, thereby providing the thermochromic color-changing properties to the sprayer container.

16. The sprayer of claim 15, wherein:
    the sprayer container is made of plastic.

17. The sprayer of claim 16, wherein:
    the sprayer container is made from blow-molded plastic.

18. The sprayer of claim 15, further including:
    a hand pump for pressurizing fluid in the thermochromic color-changing sprayer container.

19. The sprayer of claim 15, wherein:
    the sprayer container changes from the first color to the second color at about 15° C.

* * * * *

UNITED STATES PATENT AND TRADEMARK OFFICE
CERTIFICATE OF CORRECTION

PATENT NO. : 6,719,210 B2
DATED : April 13, 2004
INVENTOR(S) : Michael T. Clarke It is certified that error appears in the above-identified patent and that said Letters Patent is hereby corrected as shown below:

Column 6,
Line 16, delete "cross section"

Signed and Sealed this

Seventeenth Day of August, 2004

JON W. DUDAS
*Acting Director of the United States Patent and Trademark Office*